(12) United States Patent
Chen et al.

(10) Patent No.: US 7,149,081 B2
(45) Date of Patent: Dec. 12, 2006

(54) HARD DISK MOUNTING ASSEMBLY

(75) Inventors: Yun Lung Chen, Tu-Chen (TW); Hai Lie Ye, Shenzhen (CN); Zhou Xu, Shenzhen (CN)

(73) Assignees: Hong Fu Jin Precision Industry (Shenzhen) Co., Ltd., Shenzhen (CN); Hon Hai Precision Industry Co., Ltd., Tu-Cheng (TW)

( * ) Notice: Subject to any disclaimer, the term of this patent is extended or adjusted under 35 U.S.C. 154(b) by 124 days.

(21) Appl. No.: 10/948,553

(22) Filed: Sep. 22, 2004

(65) Prior Publication Data
US 2005/0088815 A1 Apr. 28, 2005

(30) Foreign Application Priority Data
Oct. 22, 2003 (TW) .............................. 92218768 U

(51) Int. Cl.
*G06F 1/16* (2006.01)
(52) U.S. Cl. ..................................... 361/685
(58) Field of Classification Search ................. 361/685
See application file for complete search history.

(56) References Cited

U.S. PATENT DOCUMENTS 5,349,483 A 9/1994 Tsai

FOREIGN PATENT DOCUMENTS

TW 371062 9/1999

*Primary Examiner*—Yean-Hsi Chang
(74) *Attorney, Agent, or Firm*—Wei Te Chung

(57) ABSTRACT

A hard disk mounting assembly includes a chassis (10), a first cage (20) mounted to the chassis, a hard disk drive(40) (HDD) and a second cage (60). The HDD defines a plurality of fixing openings (42). The first cage includes a plurality of mounting pillars (28) resilient connected with the cage and received in the fixing openings of the HDD at one end portion. The first cage further defines a pair of engaging apertures (34) at opposite sides thereof. The second cage has a base (62) and two connecting arms (68) depending from the base. the base forms a plurality of elastic fingers (66). The first cage is mounted to the chassis and the HDD is received in the first cage, the second cage hitches the first cage by the connecting arms with the elastic fingers pressing the HDD, thereby mounting the HDD to the chassis.

20 Claims, 4 Drawing Sheets

HARD DISK MOUNTING ASSEMBLY

BACKGROUND OF THE INVENTION

1. Field of the Invention

The present invention relates to a hard disk mounting assembly, and more particularly to a hard disk mounting assembly with a simplified configuration for convenient use and capable of vibration absorption.

2. Description of Related Art

A typical hard disk mounting assembly is usually directly mounted to a computer case with a plurality of screws. However, a screwdriver or other detaching toolings are necessary for installation or removal of the screws, which causes inconvenience and time-consuming issues in hard disk assembly or disassembly process.

A typical hard disk mounting assembly is disclosed in U.S. Pat. No. 5,349,483. The hard disk mounting assembly comprises a container, a hard disk drive (HDD) and a cover. A top face of the container defines a rectangular entrance and four screw holes are defined at four corner portions of the rectangular container. The HDD defines a plurality of screw apertures at a top face thereof. The cover defines a plurality of fixing openings corresponding to the screw apertures of the HDD and the screw holes of the container. A plurality of bolts penetrate through the fixing openings of the cover and received in corresponding screw apertures of the HDD, thereby connecting the cover with the HDD. The HDD is received in the container and fixed to the container by screws penetrating through the fixing openings of the cover and received in the corresponding screw holes of the container. However, the conventional hard disk mounting assembly disclosed above must utilize a screwdriver or other detaching toolings for installation or removal of the screws, which causes time-consuming issue in hard disk assembly or disassembly process. In addition, mounting or detaching the HDD with a screwdriver or other additional tools in limited spaces of a computer case is unduly inconvenient.

Another typical hard disk mounting assembly is disclosed in Taiwan Patent application No. 87204479. The hard disk mounting assembly comprises a chassis and a fixing bracket. The HDD is contained in the bracket. The chassis forms a pair of first slideways and defines a pair of screw apertures. A top face of the fixing bracket forms a pair of second guideways paralleling with each other corresponding to the first slideways of the chassis and a pair of fixing pieces perpendicularly extending from the top face of the bracket. Each fixing piece defines a fixing hole. In assembly, the HDD is received in the bracket. The second slideways of the bracket slide along the first slideways of the chassis. A pair of bolts respectively penetrate through the corresponding fixing holes of the bracket and received in the screw apertures of the chassis, thereby mounting the HDD to the chassis. However, a suspension attaching means adopted in the conventional hard disk mounting assembly disclosed before often causes vibration issue and can hardly provide a firm fixation. In addition, the bracket of the conventional hard disk mounting assembly is attached to the bracket by screws. A screwdriver or other detaching toolings for installation or removal of the screws is necessary, which is unduly inconvenient and laborious. Furthermore, the directly attaching means of the conventional hard disk mounting assembly can hardly absorb vibration of the bracket or the chassis.

SUMMARY OF THE INVENTION

Accordingly, an object of the present invention is to provide a hard disk mounting assembly with a simplified configuration, and which is convenient to use.

Another object of the present invention is to provide a hard disk mounting assembly capable of vibration absorption of the hard disk drive.

To achieve the above object, a hard disk mounting assembly includes a chassis, a first cage mounted to the chassis, a hard disk drive (HDD) received in the first cage and a second cage engaged with the first cage. The HDD defines a plurality of fixing openings. The first cage includes a bottom plate and two side panels extending from the bottom plate at opposite side thereof. A plurality of mounting pillars are resilient engaged with the bottom plate of the cage and received in corresponding fixing openings of the HDD at one end portion thereof. Each side panel of the first cage defines engaging apertures. The second cage has a base and two connecting arms depending from the base. the base forms a plurality of elastic fingers. Each connecting arm forms a barb at distal end thereof. The first cage is mounted to the chassis and the HDD is received in the first cage, the barbs of the connecting arms are received in the corresponding engaging apertures to make the second cage hitch the first cage with the elastic fingers of the second cage pressing the HDD, thereby mounting the HDD to the chassis.

Other objects, advantages and novel features of the present invention will be drawn from the following detailed description of preferred embodiment of the present invention with the attached drawings, in which:

DETAILED DESCRIPTION OF THE INVENTION

Figure 1:
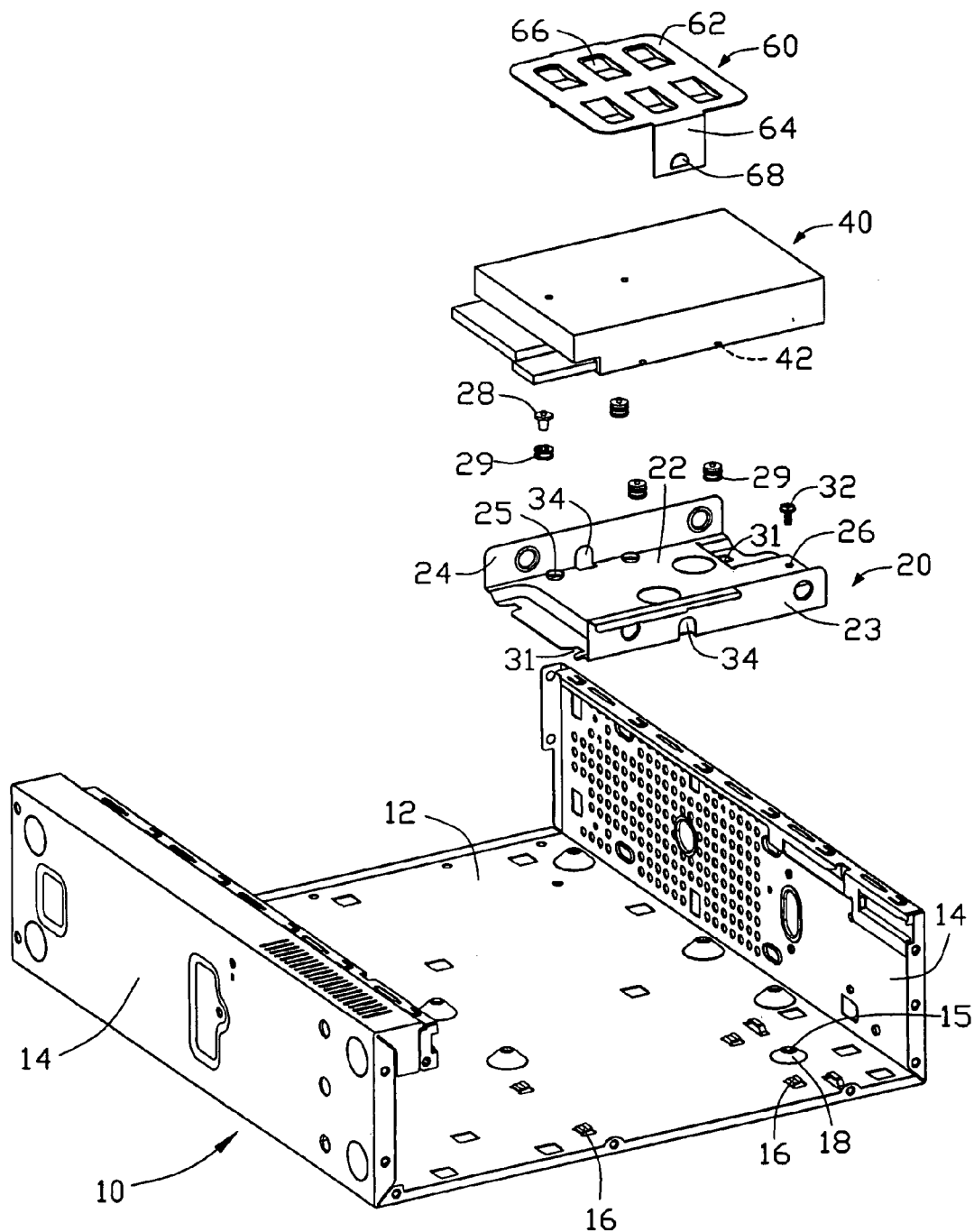
FIG. 1 is an exploded, isometric view of a hard disk mounting assembly in accordance with a preferred embodiment of the present invention comprising a hard disk, a front panel, a first operating member and a second operating member.

Referring to FIG. 1, a hard disk mounting assembly in accordance with the preferred embodiment of the present invention comprises a chassis 10, a first cage 20 mounted to the chassis 10, a hard disk drive 40 (HDD) and a second operating cage 60 engaged to the first cage 20 to receive the HDD 40.

The chassis 10 comprises a bottom wall 12, the bottom wall 12 perpendicularly extends two side walls 14 from two opposite edges (not labeled). The bottom wall 12 integrally forms a plurality of L-shaped buckles at one side portion thereof for initial orientation of the first cage 20. The bottom wall 12 further extends a convex orienting portion 18 near the buckles 16 and the orienting portion 18 defines a screw hole 15.

Figure 2:
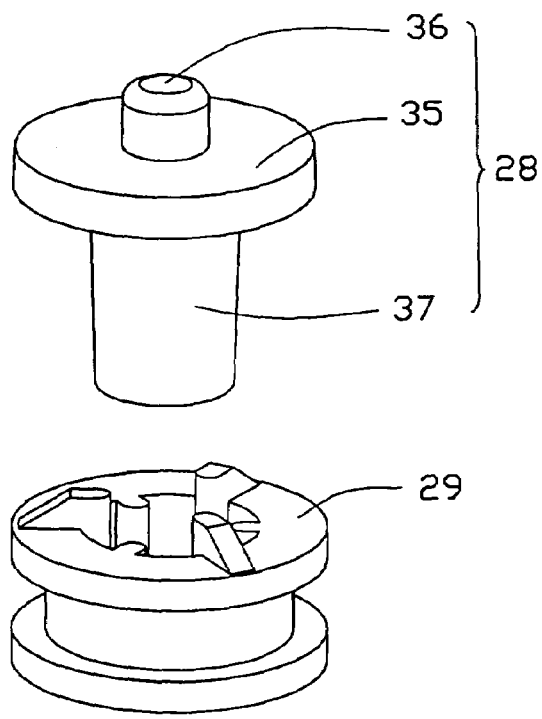
FIG. 2 is an enlarged view of an encircled portion II of FIG. 1, showing details of a hook and a rotating base of the hard disk.
Figure 3:
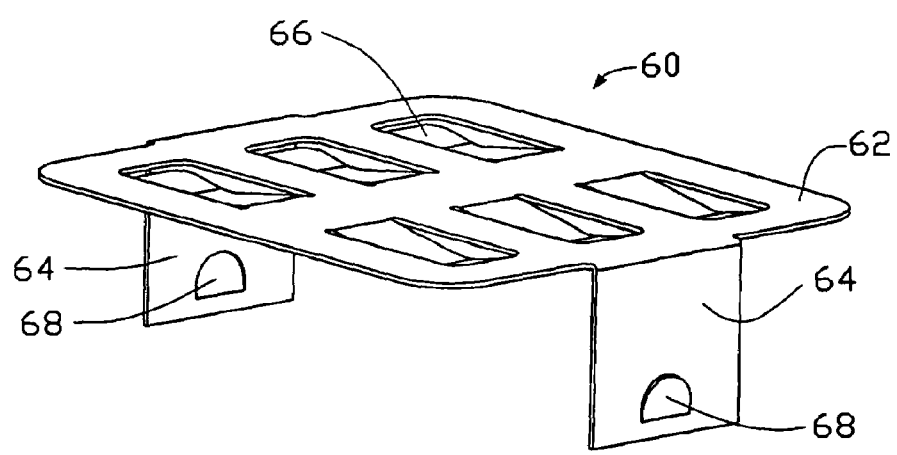
FIG. 3 is an assembled view, showing the assembled relationship between the hard disk and the second operating member.

Also referring to FIG. 2 and FIG. 3, The first cage 20 is generally U-shaped, and comprises a bottom plate 22 and two side panels 24 extending from two opposite edges of the bottom plate 22. The bottom plate 22 defines a plurality of mounting holes 25 and a mounting aperture 26 corresponding to the screw hole 15 in the orienting portion 18 of the chassis 10 thereof.

A resilient damper 29 is received in each mounting hole 25 the first cage 20. Each damper 29 is hollowed in the middle thereof, which can receives a mounting pillar 28 respectively. Each mounting pillar 28 is substantially rod-like, and forms a middle circular portion 35. An orienting end 36 is extended upwardly from the upper face (not labeled) of the circular portion 35 and a mounting end 37 is extended downwardly therefrom received in corresponding damper 29.

The bottom plate 22 defines a plurality of cutouts 31 in rear and front portion thereof, corresponding to the L-shaped buckles 16 on the chassis 10. The chassis 20 further defines a pair of engaging apertures 34 in the joint between the bottom plate 22 and the side panels 24.

The HDD 40 can be received in the first cage 20, and the HDD 40 defines a plurality of fixing openings 42 for engaging with the corresponding orienting ends 36 of the mounting pillars 28, so as to provide a preliminary orientation of the HDD 40.

The second cage 60 is engaged with the first cage 20, it is generally U-shaped and comprises a flat base portion 62 and two connecting arms 64 depending from two opposite edges of the base portion 62. The base portion 62 forms a plurality of concave elastic fingers 66 bent toward the HDD 40. The pair of connecting arm 64 of the second cage 60, each forms a barb 68 in a outward direction departing from the HDD 40 for receiving in the engaging aperture 34 of the first cage 20.

Figure 4:
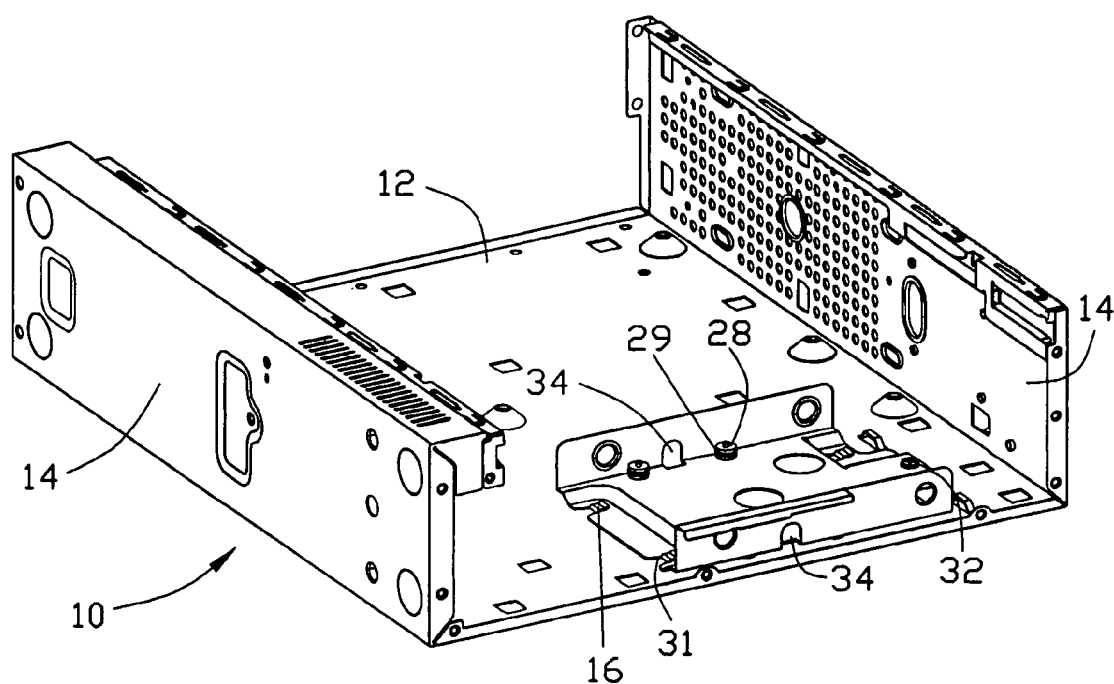
FIG. 4 is an assembled view, showing the assembled relationship between the front panel and the first operating member.
Figure 5:
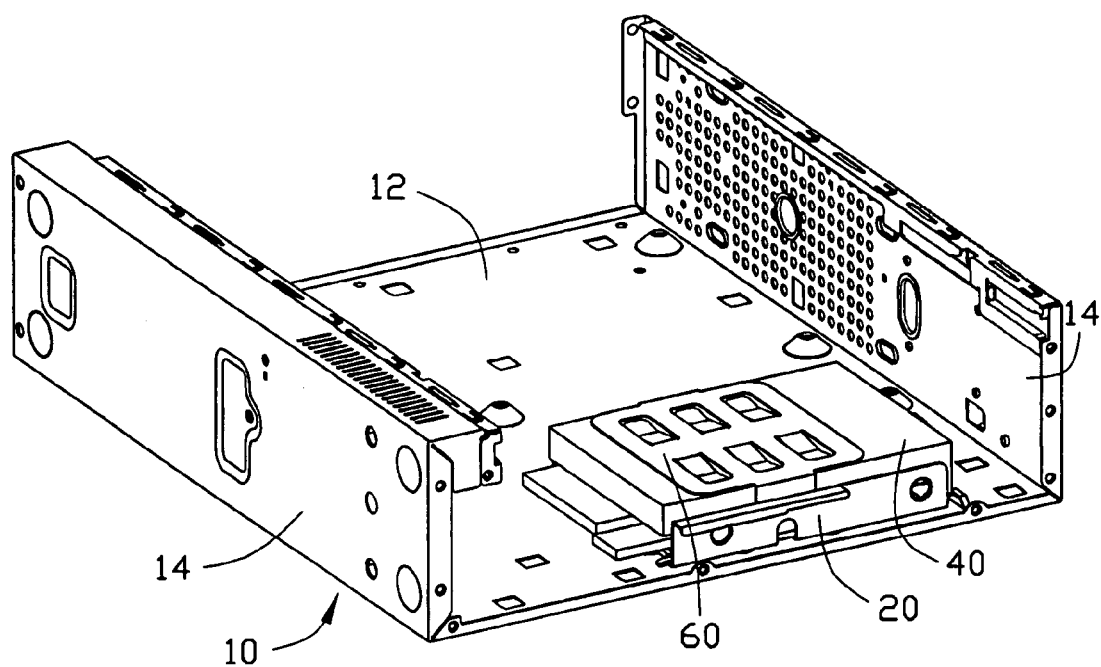
FIG. 5 is an assembled view of FIG. 1, with partly cut off for better illustration.

Referring to FIGS. 4–5, in assembly, the first cage 20 is mounted to the chassis 10 by engaging the cutouts 31 of the first cage 20 with corresponding buckles 16 of the chassis 10 for preliminary fixation, meanwhile, the mounting aperture 26 of the first cage 20 is aligned with the screw hole 15 of the chassis 10. Then the bolt 32 is penetrated through the mounting aperture 26 of the first cage 20 and engaged with the screw hole 15 of the chassis 10, thereby firmly mounting the first cage 20 to the chassis 10. The resilient dampers 29 are squeezed in corresponding mounting holes 25 in the bottom plate 22 of the first cage 20 and each mounting pillar 28 is squeezed in the hollow portion of corresponding resilient damper 29 so as to provide a flexible connection between the HDD 40 and the chassis 10.

The HDD 40 is firstly received in the first cage 20 and then mounted to the chassis by the second cage 60. The fixing openings 42 of the HDD 40 in the bottom portion thereof align with the orienting ends 36 of the mounting pillars on the first cage 20 and receive the corresponding orienting ends 36 of the pillars 36, thereby constituting the preliminary orientation of the HDD 40.

Then, the second cage 60 is moved toward the first cage 20 with the connecting arms 64 facing the HDD 40 until the connecting arms 64 on the opposite sides of the base 62 approach the corresponding side panels 23,24 of the first cage 20 respectively. During moving of the second cage 60, the elastic fingers 66 on the base 62 of the second cage 60 touch and press the top face (not labeled) of the HDD 40 afterwards.

The following step is to press the second cage 60 until the connecting arms 64 reach the corresponding engaging apertures 34 of the first cage 20 with the elastic fingers 66 of the second cage 60 pressing the HDD 40 so as to provide a resilient force on the HDD 40. Then release the second cage 60 and the second cage is raised by the resilient force of the elastic fingers 66, simultaneously the barbs 68 of the connecting arms 64 clasp edges of the engaging apertures 34. In sum, the second cage 60 hitches the first cage 20 after the preliminary orientation of the HDD 40, thereby fixing the HDD 40 to the chassis 10.

In disassembly, the second cage 60 is pressed down and the elastic fingers 66 are further resiliently deformed to allow the barbs 68 detaching from the first cage 20. Thus, the HDD 40 is detachable from the chassis 10.

While the present invention has been illustrated by the description of preferred embodiment thereof, and while the preferred embodiment has been described in considerable details, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A hard disk mounting assembly comprising:
   a chassis;
   a hard disk drive (HDD);
   a first cage attached to the chassis and receiving the HDD, the first cage comprising a bottom plate and two side panels extending from the bottom plate, each of the side panels defining an engaging aperture; and
   a second cage comprising a base and two connecting arms extending from opposite sides of the base, the base forming a plurality of elastic fingers, each of the connecting arms forming a barb for being received in the corresponding engaging aperture of the first cage;
   wherein the first cage is mounted to the chassis and the HDD is received in the first cage, the second cage hitches the first cage by the barbs with the elastic fingers pressing the HDD, thereby mounting the HDD to the chassis.

2. The hard disk mounting assembly as claimed in claim 1, wherein the bottom plate of the first cage forms a plurality of mounting holes, a resilient damper is squeezed in each mounting hole and receives a mounting pillar.

3. The hard disk mounting assembly as claimed in claim 2, wherein the mounting pillar comprises a circular portion and a mounting end extending from a lower face of the circular portion.

4. The hard disk mounting assembly as claimed in claim 3, wherein a bottom face of the HDD defines a plurality of fixing openings for receiving the mounting ends of the pillars.

5. The hard disk mounting assembly as claimed in claim 3, wherein an orienting end received in the resilient damper extends from a top face of each circular portion.

6. The hard disk mounting assembly as claimed in claim 1, wherein the chassis forms a plurality of L-shaped buckles and a convex orienting portion for mounting the first cage.

7. The hard disk mounting assembly as claimed in claim 6, wherein the convex orienting portion defines a screw hole at a top thereof.

8. The hard disk mounting assembly as claimed in claim 1, wherein the first cage defines a plurality of cutouts corresponding to the buckles of the chassis.

9. The hard disk mounting assembly as claimed in claim 8, wherein the bottom plate of the first cage defines mounting aperture corresponding to the screw hole of the chassis, and a bolt penetrates through the mounting aperture and received in the screw hole of the chassis, thereby mounting the first cage to the chassis.

10. A hard disk mounting assembly comprising:
   a hard disk drive (HDD) defining a plurality of fixing openings;
   a chassis;
   a first cage comprising a bottom plate and two side panels extending from the bottom plate, each side panel defining an engaging aperture, the bottom plate defining a plurality of mounting holes, each of the mounting holes receiving a resilient damper, the damper receiving a mounting pillar engaging with the HDD in a corresponding fixing opening; and
   a second cage comprising a base and two connecting arms extending from opposite sides of the base, the base forming a plurality of elastic fingers, each of the connecting arms forming a barb for being received in the corresponding engaging aperture of the first cage;
   wherein the first cage is mounted to the chassis and the HDD is received in the first cage, the second cage bitches the first cage by the barbs with the elastic fingers pressing the HDD, thereby mounting the HDD to the chassis.

11. The hard disk mounting assembly as claimed in the claim 10, wherein the mounting pillar comprises a circular portion, the circular portion upwardly extends an orienting end from, a top face thereof and downwardly extends a mounting end from a bottom face thereof.

12. The hard disk mounting assembly as claimed in the claim 10, wherein the chassis forms a plurality of L-shaped buckles and a convex orienting portion for mounting the first cage to the chassis.

13. The hard disk mounting assembly as claimed in the claim 12, wherein the convex orienting portion defines a screw hole at a top face thereof.

14. The hard disk mounting assembly as claimed in the claim 12, wherein the first cage defines a plurality of cutouts corresponding to the buckles of the chassis.

15. The hard disk mounting assembly as claimed in the claim 14, wherein the first cage further defines a mounting aperture corresponding to the screw hole of the chassis, and a bolt penetrates trough the mounting aperture and received in the screw hole of the orienting portion, thereby mounting the first cage to the chassis.

16. A hard disk mounting assembly comprising:
   a hard disk drive (HDD);
   a chassis;
   a fist cage attached to the chassis and receiving the HDD, the first cage comprising a pair of parallel side panels each of which defines an engaging aperture therein; and
   a second cage together with the first cage enclosing the HDD, the second cage comprising a pair of parallel connecting arms each of which forms a resilient barb thereon, the barbs of the connecting arms being received into the corresponding engaging apertures of the side panels of the first cage thereby securing the second cage to the first cage.

17. The hard disk mounting assembly as claimed in claim 16, wherein the HDD defines a plurality of fixing openings, and a plurality of pillars each with an orienting end are formed on the first cage for engaging into the fixing openings, thereby positioning the HDD in the first cage.

18. The hard disk mounting assembly as claimed in claim 17, wherein the pillars are equipped with damper structures between the HDD and the first cage.

19. The hard disk mounting assembly as claimed in claim 18, wherein the second cage forms a plurality of elastic fingers for pressing the HDD while the second cage engaging to the first cage, and said damper structures provide a damper effect along a same direction as an exerted force, derived from the elastic fingers, is directed.

20. The hard disk mounting assembly as claimed in claim 19, wherein said first cage and said second cage are assembled to each other along a same direction as an exerted force, derived from the elastic fingers, is directed.

* * * * *